Figure 1:
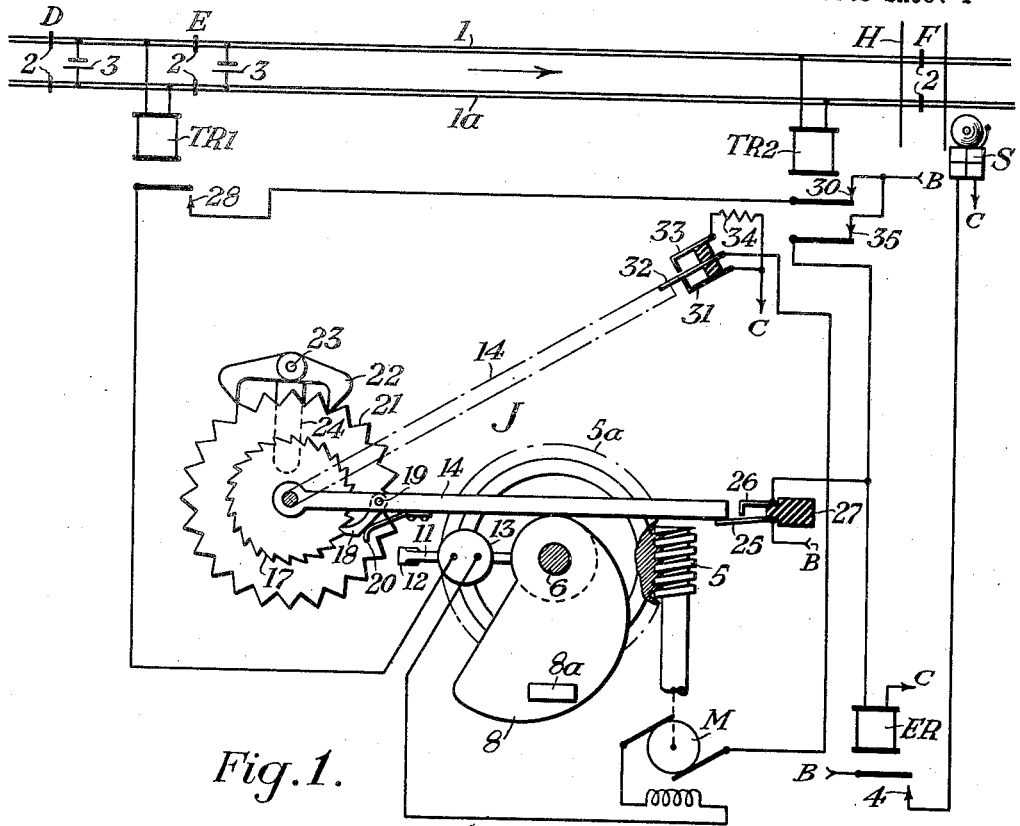

May 21, 1940.  P. J. SIMMEN  2,201,704

TIME MEASURING APPARATUS

Filed May 14, 1938  2 Sheets-Sheet 1

INVENTOR
Paul J. Simmen.
BY
HIS ATTORNEY

May 21, 1940.　　　　　P. J. SIMMEN　　　　　2,201,704
TIME MEASURING APPARATUS
Filed May 14, 1938　　　　2 Sheets-Sheet 2

INVENTOR
Paul J. Simmen.
BY
HIS ATTORNEY

Patented May 21, 1940

2,201,704

UNITED STATES PATENT OFFICE 2,201,704

TIME MEASURING APPARATUS

Paul J. Simmen, Eden, N. Y., assignor to The Union Switch & Signal Company, Swissvale, Pa., a corporation of Pennsylvania Application May 14, 1938, Serial No. 208,031

5 Claims. (Cl. 246—130)

My invention relates to time measuring apparatus; and it has particular reference to apparatus of the class incorporating means for measuring two successive intervals of time and for exerting a control at the expiration of a period of time which is determined by the length of the first measured time interval and the relative lengths of the two successive time intervals.

Apparatus of the above described class is particularly useful in determining the speed and rate of acceleration of an object and for exerting a control at the end of a varying period of time depending upon the speed and the rate of acceleration of such object. For example, apparatus of the above described class might be employed in conjunction with a warning signal positioned at a highway-railway intersection to determine the speed and rate of acceleration of trains approaching the intersection and to initiate operation of such signal in accordance with the measured speed and rate of acceleration, thereby providing a uniform period of operation of the signal prior to the arrival of trains at the intersection irrespective of the speed and rate of acceleration at which such trains are operating.

An object of my invention is to provide an improved time measuring device of the class wherein a control is established by the engagement of one member by another member biased into engagement with the one member.

Another object of my invention is the provision, in a time measuring device of the above described class, of means for utilizing a controlled motor element to govern the movement of a biased member only when the member is operated against its bias, and which device incorporates means for controlling the return of such member in response to its bias independently of the operation of the controlled motor element.

A further object of my invention is the provision, in a time measuring device of the class described, of means for utilizing a reversibly controlled motor element to operate a member to a position determined by the relative time intervals that the motor is operated in each of its two directions.

An additional object of my invention is to provide an improved time measuring device having means for measuring both the speed and the rate of acceleration of an object.

The above-mentioned and other important objects and characteristic features of my invention which will become readily apparent from the following description, are attained in a time measuring device of the class wherein a control is exerted when one member is engaged by another member biased into engagement with the one member and operated by a controlled motor element against its bias out of engagement with the one member, by operatively connecting the motor element to the biased member when and only when the motor element is controlled to operate in the direction to move the biased member against its bias out of engagement with the one member, and by providing means for restraining independently of the operation of the controlled motor element the return of the biased member in response to its bias into engagement with the one member. Additionally, means is provided for operatively connecting the controlled motor element to the one member for reversibly operating that member to a position determined by the relative time intervals that the motor element is operated in each of two directions, and means also is provided for subsequently restoring the one member to a normal position after that member is engaged by the biased member.

Figure 2:
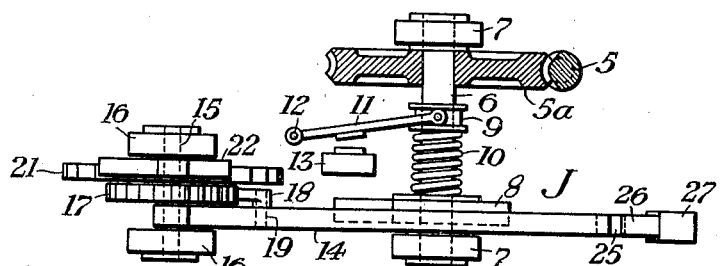
Figure 3:
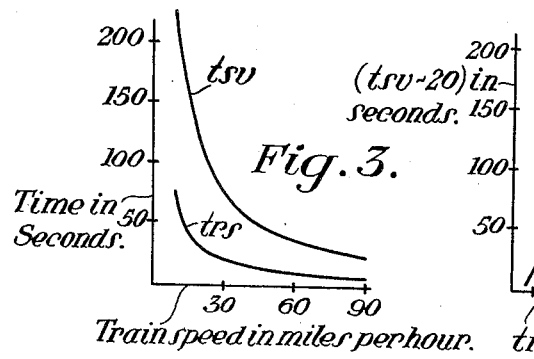
Figure 4:
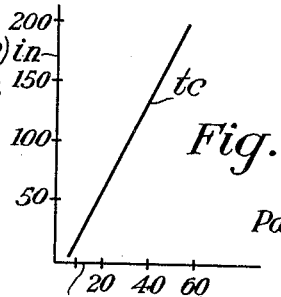
Figure 5:
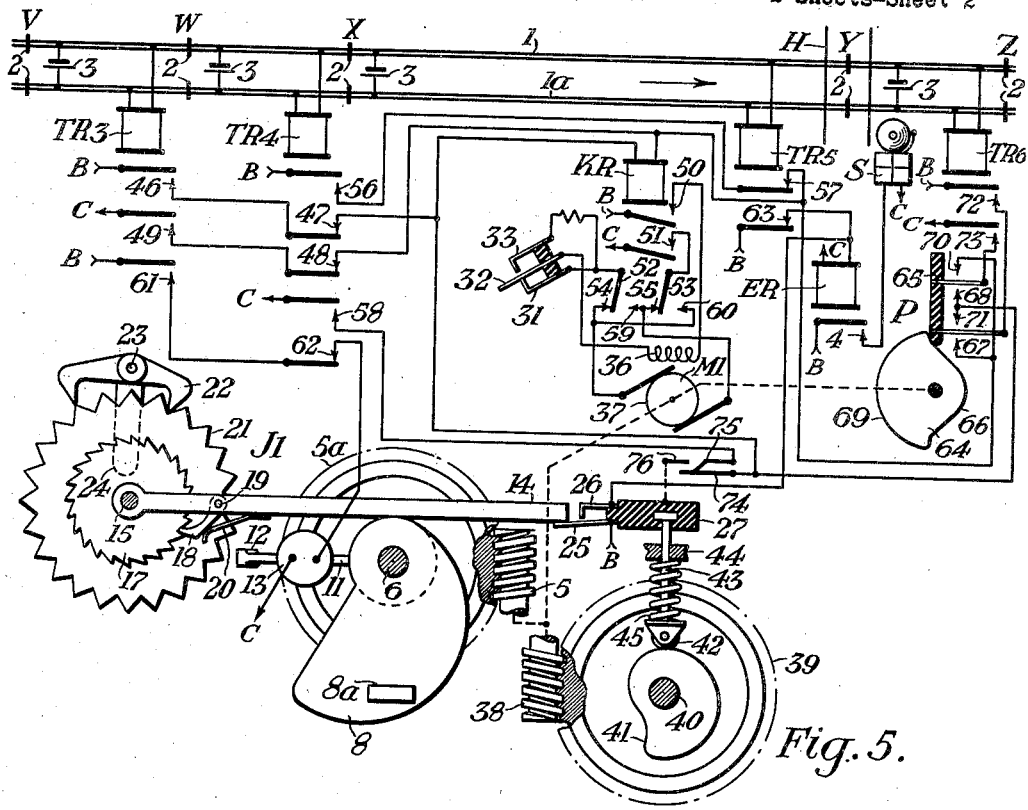
Figure 6:
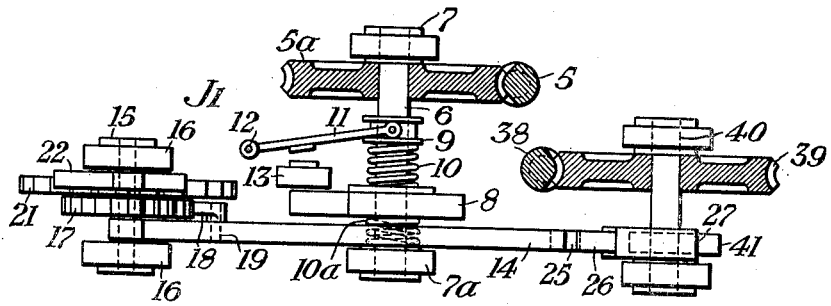
Figure 7:
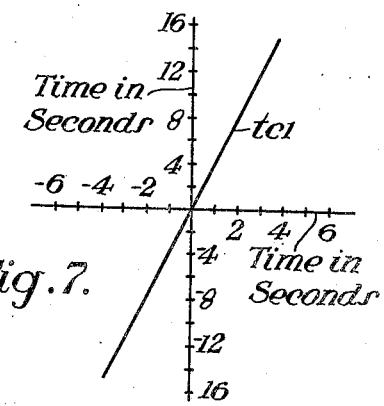

In the accompanying drawings, Fig. 1 is a diagrammatic view illustrating one form of apparatus embodying my invention incorporated into a highway crossing signal system. Fig. 2 is a plan view, partially diagrammatic, of the time measuring apparatus shown in Fig. 1. Figs. 3 and 4 are diagrams illustrating certain characteristics of the apparatus of Figs. 1 and 2. Fig. 5 is a diagrammatic view of a modified form of the apparatus shown in Figs. 1 and 2, and also embodying my invention. Fig. 6 is a plan view, partially diagrammatic, of the time measuring apparatus shown in Fig. 5. Fig. 7 is a diagram illustrating certain characteristics of the apparatus of Figs. 5 and 6.

Similar reference characters refer to similar parts in each of the several views.

Referring to Fig. 1, the reference characters 1 and 1a designate the track rails of a stretch of railway track, over which traffic moves in the direction indicated by the arrow, and which are divided by means of the usual insulated track joints 2 into track sections D—E and E—F. Each track section is provided with a track circuit. The track circuit for section D—E comprises a suitable source of current, such as a track battery 3, connected across the track rails at one end of this section and a track relay designated as TR1 connected across the rails at the other end. In a similar manner, a track battery 3 and a track relay TR2 are connected across the track rails 1 and 1a of section E—F to comprise the track circuit for section E—F. For the purpose of this description, I shall refer to section D—E as a measuring section and to section E—F as an operating section.

Track section E—F is intersected by a highway H at substantially the right-hand end of the track section, as viewed in Fig. 1. Located at the intersection is a highway crossing signal which as shown here is an audible signal in the form of an electric bell. The signal S is controlled by a relay ER, the operating circuit for signal S passing from terminal B of a suitable source of current, such as a battery not shown, through back contact 4 of relay ER, and the operating mechanism of signal S to the other terminal C of the source of current. Relay ER is normally energized, so that the signal will normally be silent, but will operate whenever relay ER becomes deenergized.

Relay ER is provided with two energizing circuits, the first, a normally closed circuit controlled by the track relay TR2, and the second, a normally open circuit controlled by contact 25—26 of a time measuring device embodying my invention and designated as a whole by the reference character J.

As shown in Figs. 1 and 2, the time measuring device J comprises a motor M which is operatively connected with a worm 5 to drive a worm wheel 5a fixed on shaft 6. Shaft 6 is journaled at its ends in suitable fixed bearing blocks 7, and has mounted loosely thereon a cam 8 which is normally free to rotate on the shaft. A clutch member 9 is secured to shaft 6 by a feather key, not shown, so that it may rotate with, and be moved along, the shaft. A spring 10 is provided between the clutch member 9 and cam 8. The forked ends of a lever 11, pinned at 12, ride in a slot of clutch member 9. The lever 11 is in magnetic relationship with an electromagnet 13, the arrangement being such that magnet 13 is effective when energized to draw lever 11 downward, as viewed in Fig. 2, against the force of the spring 10. It is to be seen, therefore, that magnet 13 when energized is effective to move clutch member 9 and spring 10 into frictional engagement with cam 8, whereby cam 8 is driven by the shaft 6, but magnet 13 when deenergized permits spring 10 to force lever 11 upwardly and move clutch member 9 and spring 10 out of engagement with cam 8 so that cam 8 is free to turn on shaft 6. The cam is provided with a counterweight 8a and is so proportioned that it is restored to its normal position, that is, the position illustrated in Fig. 1, when magnet 13 is deenergized. The cam 8 is employed to operate a time or speed measuring member here shown as a circuit controlling member 14 which is positioned so as to ride on cam 8. Member 14 is rotatably mounted on a shaft 15 in a manner so that the member turns freely thereon, and is biased by any suitable means, such as by gravity, in a clockwise direction (as viewed in Fig. 1) to a normal position wherein member 14 engages a contact finger 25, to be referred to later. Shaft 15 is journaled at its ends in suitably fixed bearing blocks 16, and fixed on the shaft is a ratchet wheel 17, the ratchet teeth of which are engaged by a locking pawl 18 which is attached at 19 to lever 14, and which is biased by a spring 20 into engagement with the teeth of ratchet wheel 17. Also fixed on shaft 15 is an escapement wheel 21, the teeth of which are adapted to be engaged by the pallets of an escapement bar 22. The escapement bar is fixed to a rock shaft 23, which is suitably journaled by means not shown, and provided with means shown here as a pendulum 24 fixed to the rock shaft for controlling the oscillation of the shaft. In the normal position of member 14, that is, the position shown in Fig. 1, the right-hand end of member 14 depresses contact finger 25 so that contact finger 25 is forced away from contact finger 26. Contact fingers 25 and 26 are insulated from each other by a rigidly fixed insulating member 27, and so arranged that when member 14 is removed from contact finger 25, the contact 25—26 is closed.

In order to more clearly disclose the first form of apparatus embodying my invention, I shall assume that it is desired to operate the highway crossing signal for a time interval of 20 seconds before a train reaches the highway. I shall further assume the measuring sections D—E to be 800 feet in length, and the operating section E—F to be 3200 feet in length. It will be understood, of course, that my invention is not limited to the above stated values of length of track section and operating intervals of the highway crossing signal, and such values may be selected best suited for the location at which the apparatus is installed.

In the normal condition of the apparatus, that is, the condition illustrated in the drawings, the track relays TR1 and TR2 are energized; relay ER is energized by virtue of its first circuit which passes from terminal B through front contact 35 of relay TR2 and the winding of relay ER to terminal C; the circuit controlling member 14 of time measuring device J actuates contact finger 25 so that contact 25—26 is open; and device J is deenergized.

In explaining the operation of the first form of apparatus embodying my invention, I shall assume that a train moving at a speed of 90 miles per hour in the direction of normal traffic enters track section D—E so that relay TR1 becomes released and closes its back contact 28. This completes a circuit passing from terminal B through front contact 30 of relay TR2, back contact 28 of relay TR1, winding of magnet 13 of the time measuring device J, the armature and field windings of motor M of time measuring device J, and contact 32—31, to be referred to later, to terminal C, so that motor M rotates shaft 6 in a counterclockwise direction (Fig. 1). Since magnet 13 is energized in series with motor M, magnet 13 attracts the lever 11 and forces clutch 9 and spring 10 into frictional engagement with cam 8 so that cam 8 rotates in response to the rotation of shaft 6. The rotation of cam 8 moves circuit controlling member 14 in a counterclockwise direction in opposition to its bias, away from its normal position and out of engagement with contact finger 25, whereupon contact 25—26 closes. Contact 25—26 closed completes the second energizing circuit for relay ER, referred to previously, which passes from terminal B through contact 25—26 and the winding of relay ER to the terminal C.

Motor M continues to rotate shaft 6 in a counterclockwise direction until the train enters track section E—F and track relay TR2 becomes deenergized. When relay TR2 releases, front contact 35 opens to interrupt the first energizing circuit for relay ER (which remains energized by virtue of its second circuit over contact 25—26), and front contact 30 opens to interrupt the previously traced energizing circuit for motor M and magnet 13 of time measuring device J. Motor M now stops rotating, and magnet 13 becomes deenergized so that spring 10 forces clutch member 9 out of frictional engagement with cam 8, and since cam 8 is now free to rotate on shaft 6, cam 8 returns to its original position by virtue of its counterweight 8a. Circuit controlling member 14, however, is detained at the position to which it was raised by cam 8 by virtue of the locking pawl 18, which now engages the teeth of ratchet wheel 17 to prevent retrograde motion of the circuit controlling member. Circuit controlling member 14 now returns to its normal position in response to its bias, at a uniform rate governed by the escapement wheel 21, the teeth of which are engaged by the pallets of the escapement bar 22 which rocks about the shaft 23. Since the operation of an escapement wheel and bar is well known, it is not thought necessary to describe in detail how the escapement bar 17 and bar 18 coact to control the return of the circuit controlling member to its original position. When member 14 regains its normal position, it opens contact 25—26 to deenergize relay ER and start operation of signal S.

The parts are so proportioned that if the train travels at a speed of 90 miles per hour through the measuring section to operate the motor M of time measuring device J for some 6 seconds, the circuit controlling member 14 is raised a distance such that when motor M and magnet 13 are deenergized and cam 8 returns to its normal position, circuit controlling member 14 returns to its normal position in approximately 4 seconds. Since the operating section E—F is approximately 3200 feet in length, a train operating at 90 miles per hour consumes approximately 24 seconds in traversing the section. Therefore, it can be seen that when circuit controlling member 14 returns to its original position at the end of 4 seconds, and engages contact finger 25 to open contact 25—26 interposed in the second energizing circuit for relay ER, relay ER then becomes released and closes back contact 4 to complete the operating circuit for signal S; and signal S then operates for a time interval of 20 seconds prior to the train reaching the highway, and continues to operate until such time as the rear of the train clears the highway H and vacates the track section E—F. When this happens, relay TR2 becomes reenergized and picks up to close contacts 30 and 35, the closing of front contact 35 completing the first energizing circuit for relay ER, and relay ER becomes energized to open back contact 4 and to stop the operation of signal S.

In the event a train approaches highway H traveling at a speed less than 90 miles per hour, a time interval of 20 seconds operation is provided for signal S by virtue of the construction of time measuring device J. I shall now assume a train operating at 60 miles per hour enters track section D—E on its way toward the intersection. When this happens, relay TR1 is released and motor M and magnet 13 are energized and set into operation the same as explained for the train traveling at 90 miles per hour. The train traveling at 60 miles per hour consumes approximately 9 seconds in traversing the measuring section, and during this 9 seconds cam 8 is rotated counterclockwise, since magnet 13 is energized, to actuate circuit controlling member 14. Circuit controlling member 14 is raised at a variable rate, that is to say, for successive one-second intervals of operation of cam 8 the circuit controlling member 14 is caused to move different angular amounts about its shaft 15; this angular movement progressively increasing for a limited time. The result of this upward movement of circuit controlling member 14 is to cause contact finger 25 to engage contact finger 26, and to complete the second energizing circuit for relay ER. Then, when the train enters track section E—F and motor M and magnet 13 of time measuring device J become deenergized, cam 8 returns to its original position; circuit controlling member 14 is prevented by pawl 18 engaging the teeth of ratchet gear 17 from returning immediately to its original position; and escapement wheel 21 and bar 22 coact to control the return of circuit controlling member 14 to its original position at a uniform rate. Since the train operating at 60 miles per hour consumes approximately 36 seconds in traversing the track section E—F, and a 20-seconds operating interval is desired, the parts are proportioned so that circuit controlling member 14 returns to its original position in approximately 16 seconds.

I shall now assume a train traveling at 30 miles per hour approaches the highway. This train consumes approximately 18 seconds in moving through the measuring section D—E and entering the operating section E—F. Cam 8 is rotated counterclockwise during this 18 seconds and is then released and allowed to swing back to its normal position. Cam 8 is so shaped that circuit controlling member 14 is moved upward by cam 8 during the 18 seconds period the train occupies the measuring section to a position where it requires substantially 53 seconds operation of escapement wheel 21 and bar 22 before circuit controlling member 14 is restored to its normal position and contact 25—26 is opened. Since a train of a speed of 30 miles per hour requires approximately 73 seconds to advance the 3200 feet from the entrance of section E—F to the highway, it follows that a 20-seconds operation of the signal S is effected before the train reaches the intersection.

The curve $trs$ of Fig. 3 illustrates the time consumed in the measuring section D—E by trains at different speeds and which time determines the upward movement of the circuit controlling member 14. The curve $tsv$ illustrates the time required by trains of different speeds to advance from the entrance of section E—F to the intersection. The delay in setting the signal into operation after the train has passed the entrance of section E—F to assure a 20-seconds operating period for signal S is determined by subtracting 20 seconds from the value given by the curve $tsv$ for each speed of the train. The curve $tc$ of Fig. 4 illustrates the relationship between the curve $trs$ and the delay in setting the signal into operation ($tsv$—20) and from which curve $tc$ the shape of the cam is obtained.

From an analysis of these curves and from the foregoing description of the operation of the apparatus at train speeds of 30, 60 and 90 miles per hour, it is apparent that with the apparatus constructed in the manner described, the circuit controlling member 14 is moved upward about its shaft at a variable rate and is restored at a uniform rate, and the highway crossing signal S is set into operation 20 seconds prior to a train reaching the intersection. As stated hereinbefore, my invention is not restricted to the specific speed limits, operating time and track layout here described.

In the event a train should stop or otherwise consume an unusually long period in the measuring section D—E, cam 8 would be rotated an unusual movement counterclockwise and circuit controlling member 14 would be raised to its ultimate position illustrated by dotted lines in Fig. 1. In this ultimate position, circuit controlling member 14 engages contact finger 32 to open the contact 32—31, and to close contact 32—33. When contact 32—33 is closed, a resistance 34 is interposed in the energizing circuit for motor M and magnet 13 of the time measuring device J, with the result that motor M will be energized sufficiently to hold cam 8 and circuit controlling member 14 in the ultimate position, but not sufficiently to move cam 8 and circuit controlling member 14 from that position. Then, when the train enters track section E—F and relay TR2 releases, motor M and magnet 13 of the time measuring device J become deenergized, and the return of circuit controlling member 14 to its normal position in response to its bias is controlled by the action of the escapement wheel 21 and bar 22.

It is to be understood that apparatus, not shown, may be provided for traffic approaching the highway from the right to the left, and that my apparatus may be used with such apparatus for effecting directional control of the highway crossing signal.

In the second form of apparatus embodying my invention, the apparatus of Figs. 1 and 2 is modified so as to provide means which determines the speed and the rate of acceleration or deceleration of a train approaching the highway, and provides a uniform operating period for the signal prior to the train reaching the highway.

Referring now to Fig. 5, the track rails 1 and 1a of the stretch of railway track are divided by means of the insulated track joints 2 into track sections V—W, W—X, X—Y, and Y—Z; these sections being traversed in the order named by a train approaching the highway when moving in the direction of normal traffic as shown by the arrow. Each track section is provided with a track circuit comprising a track battery 3 connected across the rails at one end of the section, and a track relay connected across the track rails at the other end. Track relay TR3 is included in the track circuit for section V—W, and similarly track relays TR4, TR5 and TR6 are included in the track circuit for sections W—X, X—Y, and Y—Z, respectively. For the purpose of this description, I shall refer to section V—W as a measuring section, section W—X as a checking section, section X—Y as an operating section, and section Y—Z as a correcting section.

Track section X—Y is intersected by a highway H at substantially the right-hand end of the section, as viewed in Fig. 5. Located at the intersection is a highway crossing signal S which as shown here is an audible signal in the form of an electric bell. The signal S is controlled in a manner similar to the control of signal S described in connection with the first form of apparatus embodying my invention. That is to say, signal S is controlled by relay ER, the operating circuit for signal S passing from terminal B through back contact 4 of relay ER and winding of signal S to terminal C. Relay ER is normally energized over front contact 63 of track relay TR5, and is provided with another energizing circuit, which is normally open, controlled by contact 25—26 of a time measuring device embodying my invention and designated as a whole by the reference character J1.

Time measuring device J1 differs from the time measuring device J employed in the first form of apparatus embodying my invention in several details. Motor M1 is a reversible motor, having a field 36 and an armature 37, and actuates a pole changing element P. As shown, pole changing element P comprises a cam 64 which is adapted to operate a pole changing circuit controller 65 in such a manner that as the cam is rotated counterclockwise from the illustrated normal or mid position, the operating member 65 drops into a depression 66 provided on cam 64 and back contacts 67 and 68 of pole changer P are closed. At such times as the cam 64 is operated clockwise from its normal position, the member 65 is lifted by a raised portion 69 provided on cam 64 and the front contacts 70 and 71 of pole changer P are closed. In the normal position of cam 64 all contacts of the pole changer P are open. Motor M1 also drives worm 5 and worm 38, worm 38 operating a worm wheel 39 to rotate a shaft 40. Shaft 40 is journaled suitably at its ends, and provided with a cam 41 rigidly fixed to the shaft. Cam 41 actuates a roller 42, which in turn actuates a member 43, which operates within a fixed supporting member 44. The upper end of member 43 engages the insulation block 27 of the contact 25—26 which, as will be pointed out hereinafter, functions as an acceleration measuring member. A spring 45 acts upon the supporting member 44 and wheel 42 so as to force wheel 42 into engagement with cam 41, thereby biasing contact 25—26 in a downward direction (as viewed in Fig. 5). Shaft 6 of time measuring device J1 is provided with a spring 10a which acts to force cam 8 away from bearing 7a of shaft 6 and out of the plane of member 14. The remainder of the device, that is, cam 8, clutch member 9, spring 10, clutch lever 11, magnet 13, circuit controlling member 14, shaft 15, and the ratchet and escapement wheels are all the same as described in detail in connection with corresponding parts of the time measuring device J.

In order to more clearly disclose the second form of apparatus embodying my invention, I shall again assume a time interval of 20 seconds operation of the highway crossing signal before a train reaches the highway. I shall also assume the measuring section V—W to be 800 feet in length, the checking section W—X to be 800 feet in length, the operating section X—Y to be 2400 feet in length, and the correcting section Y—Z to be approximately 800 feet in length. It will be understood, of course, that my invention is not limited to the above stated lengths of track section and operating intervals of the highway crossing signal and such values may be selected best suited for the location at which the apparatus is installed.

In the normal condition of the apparatus, that is, the condition illustrated in Fig. 5, the track relays TR3, TR4, TR5, and TR6 are energized; relay ER is energized by virtue of its first energizing circuit which passes from terminal B through front contact 63 of relay TR5 and the winding of relay ER to terminal C; the circuit controlling member 14, cam 8, cam 41, contact finger 25, and motor M of the time measuring device J1 are all in their respective normal positions.

In illustrating the operation of the second form of apparatus embodying my invention, I shall first assume that a train approaches the highway H in the direction of normal traffic at a constant speed of 60 miles per hour. It is to be noted that the train traveling at 60 miles per hour consumes approximately 9 seconds in the measuring section V—W; 9 seconds in the checking section W—X, and 27 seconds in the operating section W—Y.

When the train enters track section V—W, relay TR3 becomes released and back contacts 46, 49, and 61 close. The closing of back contact 61 completes a circuit passing from terminal B through back contact 61 of relay TR3, front contact 62 of relay TR4 and the winding of magnet 13 of time measuring device J1 to terminal C; and magnet 13 becomes energized to attract the clutch lever 11 and clutch member 9. This actuation of the clutch lever 11 forces clutch member 9 and spring 10 into frictional engagement with cam 8, and also compresses spring 10a so that cam 8 is forced downward, as viewed in Fig. 6, into the plane of engagement with circuit controlling member 14. The closing of back contacts 46 and 49 of relay TR3 completes a circuit passing from terminal B through back contact 46 of relay TR3, front contact 47 of relay TR4, the left-hand terminal of a polarized relay KR and the winding of relay KR to the right-hand terminal of relay KR, front contact 48 of relay TR4, and back contact 49 of relay TR3 to terminal C. The polarized relay KR is now supplied with current of a polarity which I shall term normal polarity, and becomes energized to close front contacts 50 and 51, and to operate its polar contact members 52 and 53 to the left-hand position, as viewed in Fig. 5, to make contact with normal polar contacts 54 and 55, respectively. Field 36 and armature 37 of motor M1 now become energized by virtue of a circuit passing from terminal B through front contact 50 of relay KR, motor field 36, contact 31—32 to be referred to later, normal polar contact 52—54 of relay KR, the left-hand terminal of armature 37 and the winding of armature 37 to the right-hand terminal of armature 37, normal polar contact 55—53 and front contact 51 of relay KR to terminal C. It is to be noted that armature 37 of motor M1 is supplied with current passing through its winding from its left terminal to its right terminal, and that motor M1 rotates in a counterclockwise direction.

The rotation of motor M1 drives worms 5 and 38, and also the pole changer P. Worm 5 in turn drives shaft 6, so that cam 8 rotates and lifts circuit controlling member 14 against its bias out of engagement with contact finger 25, and contact finger 25 makes contact with contact finger 26 so that the second energizing circuit for relay ER, which passes from terminal B through contact 25—26 and the winding of relay TR to terminal C, is completed. Worm 38 drives shaft 40 so that cam 41 is rotated to actuate insulation member 27 of contact 25—26 and to lift contact 25—26. Pole changing element P is also actuated in a counterclockwise direction by the rotation of motor M1, so that member 65 drops into the depression 66 of cam 64 and back contacts 67 and 68 of pole changing element P close.

As stated previously, a train operating at 60 miles per hour consumes 9 seconds in traversing section V—W prior to entering section W—X. Thus, during this 9 seconds period, cam 8 lifts circuit controlling member 14; cam 41 lifts contacts 25—26; and pole changing element P is actuated in a counterclockwise direction. Then, at the end of the 9-seconds measuring period, the train enters track section W—X and relay TR4 becomes released to open front contacts 47 and 48, which are included in the previously traced energizing circuit for relay KR, and front contact 62, which is included in the energizing circuit for magnet 13 of the time measuring device J1. Magnet 13 of time measuring device J1 is now deenergized, spring 10 forces clutch member 9 out of engagement with cam 8, so that cam 8 is again free to revolve on shaft 6; cam 8 returns to its original position by virtue of the counterweight 8a and the proportionment of its parts; and spring 10a acts upon cam 8 so that the cam is forced out of the plane of engagement with circuit controlling member 14. The circuit controlling member 14 is detained at the position to which it was raised by cam 8 by virtue of the locking pawl 18 engaging the teeth of the ratchet gear 17, and the return of member 14 in response to its bias to its original position is controlled to a uniform rate by the action of the escapement wheel 21 and bar 22.

Since the previously traced normal energizing circuit for relay KR became opened when back contacts 47 and 48 of relay TR4 opened, relay KR is no longer supplied with current of normal polarity. However, relay KR is energized with current of reverse polarity by virtue of a circuit passing from terminal B through back contact 56 of relay TR4, front contact 57 of relay TR5, the right-hand terminal of relay KR and the winding of relay KR to the left-hand terminal of relay KR, contact 74—75 to be referred to later, and back contact 58 of relay TR4 to terminal C. Relay KR now shifts its polar contact members 52 and 53 to the right-hand position to make contact with reverse polar contacts 59 and 60, respectively. Field 36 and armature 37 of motor M1 are now supplied with current by virtue of a circuit passing from terminal B through front contact 50 of relay KR, field 36, contact 31—32, reverse polar contact 52—59 of relay KR, the right-hand terminal of armature 37 and the winding of armature 37 to the left-hand terminal of armature 37, reverse polar contact 60—53 of relay KR and front contact 51 of relay KR to terminal C. Motor M1 now rotates in a clockwise direction, and drives shafts 6 and 40 and the pole changing element P. The rotation of shaft 6 plays no part in this operation of the mechanism, but the rotation of shaft 40 rotates cam 41 in a clockwise direction, so that the movement of contact 25—26 in response to its bias is governed in accordance with the movement of cam 41. The pole changing element P is also actuated, so that cam 64 is rotated in a clockwise direction. Since the train operating at 60 miles an hour consumes 9 seconds in passing through the section W—X prior to entering operating section X—Y, cam 41 lowers contact 25—26, and the pole changing element P actuates its cam 64, during this period.

At the end of this 9 seconds period, the train enters track section X—Y, and track relay TR5 becomes released. Front contact 57 of relay TR5 now opens to open the last traced circuit for relay KR, and relay KR becomes deenergized to open its front contacts 50 and 51, and to open the energizing circuit for field 36 and armature 37 of motor M1. Motor M1 now stops rotating, and consequently shafts 6 and 40 stop rotating, and the actuation of cam 64 of the pole changing element P is stopped. Furthermore, since the train operating at a constant speed consumes the same time interval in traversing the checking section W—X as it did in traversing the measuring section V—W, the contact 25—26 and the cam 64 of pole changing element P are stopped at their original positions. The relay TR5 also opens its front contacts 63 to open the first energizing circuit for relay ER, but relay ER is held energized by virtue of its second energizing circuit, which includes contact 25—26.

The parts are so proportioned that if a train operates at a speed of 60 miles per hour through the measuring, checking and operating sections, circuit controlling member 14 is raised by cam 8 a distance such that when magnet 13 of time measuring device J1 is deenergized and cam 8 returns to its original position, circuit controlling member 14 is returned by its bias to its original position in approximately 16 seconds. As mentioned hereinbefore, the train consumes some 9 seconds in traversing section W—X, and some 27 seconds in traversing section X—Y, so that after the train enters track section W—X and magnet 13 of time measuring device J1 is deenergized, some 36 seconds elapse before the train reaches highway H. Therefore, when, at the end of its 16 seconds return period, circuit controlling member 14 reaches its original position and engages contact finger 25 to open contact 25—26, the second energizing circuit for relay ER is opened; relay ER becomes deenergized to close its back contact 4 and to complete the energizing circuit for signal S; and signal S operates for a 20-seconds time interval prior to the train reaching the highway H.

When the train reaches the highway and enters track section Y—Z, relay TR6 becomes energized and closes back contacts 72 and 73. However, since the train operated at a constant speed through the measuring end checking section, the closing of back contacts 72 and 73 of relay TR6 at this time plays no part in the operation of the time measuring device J1. Then, when the train vacates track section X—Y, relay TR5 picks up to close front contacts 57 and 63; the closing of front contact 63 completing the first energizing circuit for relay ER, which picks up to open back contact 4 and stop the operation of signal S. And when the train vacates track section Y—Z, relay TR6 picks up, and the apparatus returns to its normal condition. It can be seen, therefore, that the second form of apparatus embodying my invention operates in a manner similar to the operation of the first form of apparatus embodying my invention for a train operating over the stretch at a constant speed. This similarity in operation results since cams 8 of time measuring device J and time measuring device J1 are provided with the same characteristics.

I shall now assume that a train approaches the highway at a variable rate of speed, that is, the train operates in the measuring section at a speed of 60 miles per hour and in the checking section accelerates to an average speed of 65 miles per hour, and then operates through the operating section at a speed of 65 miles per hour. When the train enters section V—W, the time measuring device J1 is set into operation; circuit controlling member 14 and contact 25—26 are raised from their original positions and pole changing element P is actuated during the 9-seconds period the train traverses section V—W. Then, when section W—X is entered, circuit controlling member 14 begins to return to its original position at a uniform rate, contact 25—26 is lowered by its bias in response to a lowering of cam 41, and pole changing element P is reversely actuated. Because the train is now operating at 65 miles an hour, it consumes but 8.4 seconds in traversing section W—X, so that section X—Y is entered by the train prior to contact 25—26 and cam 64 of pole changing element P returning to their normal positions. Thus, since the entrance of the train upon section X—Y stops the operation of the motor M1, contact 25—26 is stopped at a position above its normal position, as viewed in Fig. 5. Consequently, circuit controlling member 14, being returned to its original position by virtue of its bias, engages contact finger 25 to open contact 25—26 before circuit controlling member 14 reaches its original position. Since circuit controlling member 14 was raised a distance by cam 8 such that when controlled by escapement wheel 21 and bar 22, the return of member 14 to its normal position requires some 16 seconds, it can be seen that the signal is now set into operation prior to the expiration of the 16 seconds period.

The parts are so proportioned that if cam 41 raises contact 25—26 for a period of 9 seconds, and then lowers it for a period of 8.4 seconds, the circuit controlling member 14 will engage contact finger 25 and open contact 25—26 some 14 seconds after the train has entered track section W—X. It will be noted that a train operating at 65 miles an hour consumes some 25.6 seconds in traversing the operating section X—Y, and some 8.4 seconds in the checking section W—X, so that after the train enters section W—X some 34 seconds elapse before the train reaches highway H. Therefore, it can be seen that a 20-seconds operating period is provided for signal S prior to the train reaching the intersection.

When the train enters the correcting section Y—Z on its way past the intersection, track relay TR6 releases and closes back contacts 72 and 73. Since pole changing element P is not in its normal position, having had its cam 64 actuated in a counterclockwise direction for 9 seconds and in a clockwise direction for 8.4 seconds so that contact member 65 rests in depression 66 of cam 64 and back contacts 67 and 68 are closed, a circuit is completed from terminal B through back contact 72 of relay TR6, contact 67 of pole changing element P, the right-hand terminal of relay KR and the winding of relay KR to the left-hand terminal of relay KR, contact 68 of pole changing element P and back contact 73 of relay TR6 to terminal C. Relay KR is now supplied with current of reverse polarity, so that motor M1 is operated clockwise. This clockwise rotation of motor M1 rotates shaft 40 to rotate cam 41 and lower contact 25—26 and circuit controlling member 14, and to actuate the cam 64 of pole changing element P in a clockwise direction. When the cam member 64 reaches its mid position, member 65 is raised so that back contacts 67 and 68 are opened. The opening of these contacts opens the circuit just traced for relay KR, relay KR becomes deenergized, and motor M1 stops rotating. Also at this point, contact 25—26 and circuit controlling member 14 have reached their respective normal positions. When the train vacates section X—Y, relay TR5 becomes reenergized, relay ER becomes energized and signal S stops operating. And when the train vacates section Y—Z, relay TR6 becomes reenergized, and the apparatus returns to its normal condition.

Cam 41 is so shaped that if a train decelerates in section W—X, so that motor M1 is operated longer in a clockwise direction than in a counterclockwise direction, contact 25—26 is lowered below its normal position, so that circuit controlling member 14 requires more time to reach contact 25 and become stopped than it would had contact 25—26 been returned to its normal position. For example, assume the train operates at 60 miles per hour in the measuring section; decelerates to 55 miles per hour in the checking section; and remains at this 55 miles per hour speed in the operating section. Then, motor M1 is driven in its counterclockwise direction for 9 seconds and in a clockwise direction for approximately 10 seconds, and motor M1 is stopped when section X—Y is entered, so that contact 25—26 is positioned below the normal position of the contact. The movement of circuit controlling member 14 in the clockwise direction in response to its bias is governed by escapement wheel 21 and bar 22 so that member 14 reaches its normal position at the end of a 16 seconds time interval. The member 14 is operated past its normal position by virtue of its bias until further movement is stopped by virtue of the contact controlling member 14 engaging contact finger 25 so that contact 25—26 is opened. The parts are proportioned so that for a 9-seconds counterclockwise rotation of motor M1 and a 10-seconds clockwise rotation of motor M1, circuit controlling member 14 will engage contact finger 25 and open contact 25—26 some 20 seconds after the train enters track section W—X. And, since a train operating at 55 miles per hour consumes approximately 30 seconds in traversing the operating section X—Y, and some 10 seconds in section W—X, it can be seen that a 20-seconds operating period is provided for signal S prior to the train reaching the intersection. When the train enters the correcting section Y—Z, relay TR6 becomes deenergized to close back contacts 72 and 73. And since pole changing element P is not in its normal position, having had its cam member 64 actuated counterclockwise for 9 seconds and then clockwise for 10 seconds so that contact member 65 rests on the raised portion 69 of cam 64 and contacts 70 and 71 are closed, a circuit is completed from terminal B through back contact 72 of relay TR6, contact 71 of pole changing element P, the left-hand terminal of relay KR and the winding of relay KR to the right-hand terminal of relay KR, contact 70 of pole changing element P and back contact 73 of relay TR6 to terminal C. Relay KR is now supplied with current of normal polarity, so that motor M1 is operated in a counterclockwise direction. This operation of motor M1 rotates shaft 40 to rotate cam 41 and to raise contact 25—26 and the circuit controlling member 14, and to actuate cam 64 of pole changing element P in a counterclockwise direction. When cam 64 reaches mid position, contact member 65 is lowered so that contacts 70 and 71 of pole changing element P are opened. The opening of these contacts opens the previously traced circuit for relay KR, relay KR becomes released and motor M1 stops rotating. At this point also, contact 25—26 and circuit controlling member 14 have reached their respective normal positions, so that when the train vacates section X—Y and relay TR5 is picked up, signal S stops operating, and when section Y—Z is vacated, relay TR6 becomes reenergized and the apparatus returns to its normal condition.

The curve tc1 of Fig. 7 illustrates the difference in time consumed by an accelerating (or decelerating) train in the measuring and checking sections and the delay (or gain) to be added to the return period for the circuit controlling member 14, and from which curve the shape of the cam 41 is obtained. In Fig. 7, the horizontal axis represents the difference in time consumed by a train operating at a varying speed in the measuring and checking sections, while the vertical axis represents the gain or delay to be added to the return period for a circuit controlling member 14. The shape of cam 8 is determined by the curves shown in Figs. 3 and 4, as explained previously in connection with the description of the operation of the apparatus of Figs. 1 and 2.

From an analysis of these curves, and from the foregoing description of the operation of the apparatus, it is apparent that with the apparatus constructed in the manner described, the circuit controlling member 14 is moved upward about its axis at a variable rate and is restored at a uniform rate to measure the speed of a train, while contact 25—26 is moved upward and back at a uniform rate to measure the rate of acceleration or deceleration of the train, so that the highway crossing signal is set into operation some 20 seconds prior to the train reaching the intersection.

In the event the train should stop or otherwise consume an unusually long period of time in section V—W, the circuit controlling member 14 would then be rotated to its ultimate position and engage contact finger 32 so that contact finger 32 breaks engagement with contact finger 31 and makes engagement with contact finger 33. As was explained in detail in connection with the operation of the apparatus embodying the first form of my invention, motor M1 is retained energized at that position until the train enters the track section W—X; then it is rotated in a clockwise direction. Similarly, in the event that the train should stop or otherwise consume an unusually long period of time in section W—X, the contact member 76 would then be lowered to its ultimate position and engage contact member 74 so that contact member 74 breaks engagement with contact member 75. As contact 74—75 is interposed in the reverse energizing circuit for relay KR, the opening of contact 74—75 opens the energizing circuit for relay KR, relay KR releases and front contacts 50 and 51 of relay KR open to open the energizing circuit for motor M1 so that motor M1 stops operating. Then, when the train enters section Y—Z, the relay KR is supplied with an energizing current by virtue of the operation, previously described, of pole changing element P, so that motor M1 is operated to its normal position.

It is to be understood that apparatus, not shown, may be provided for traffic approaching the highway from right to left, and that my apparatus may be used with such apparatus for effecting directional control of the highway crossing signal.

One advantage of apparatus embodying my invention is the provision of novel and improved time measuring means which may be employed to measure the speed of trains approaching a highway crossing, and which incorporates means for providing a uniform operating period for the highway crossing signal for all trains operating along the stretch of track irrespective of the speed at which such trains operate. Another advantage of time measuring apparatus embodying my invention is that the above-mentioned time measuring device may be modified to incorporate means for determining the rate of acceleration of trains and for modifying the control exerted by such device in accordance with the measured rate of acceleration.

Although I have herein shown and described only two forms of time measuring apparatus embodying my invention, it is understood that various changes and modifications may be made therein within the scope of the appended claims without departing from the spirit and scope of my invention.

Having thus described my invention, what I claim is:

1. A time measuring device of the class wherein the movement of a first member against its gravity bias out of engagement with a second member is effected by means of an electric motor operable at a predetermined rate and acting through a cam which is operatively connected by a magnetic clutch with the motor when and only when the motor is controlled to operate in a direction to move the first member against its bias, characterized by the combination with the first member of retarding means for retarding the return of the first member in response to its bias into engagement with the second member, said retarding means including an escapement mechanism effective when and only when the cam is disconnected from the motor and operative independently of the operation of the motor whereby further operation of the motor may be dispensed with or may be utilized to control additional elements of the time measuring device.

2. In combination, a reversible motor, control means for selectively operating said motor, a first member biased to engage a second member when said members are in corresponding relative positions, means effective when said motor is operated in a first direction to move said first member against its bias out of engagement with said second member, retarding means operative when said motor is reversed and effective independently of the operation of said motor for controlling the movement of said first member in response to its bias toward said second member, and means responsive to the operation of said motor for moving said second member to a position determined by the relative time intervals said motor is operated in each of its two directions, whereby the corresponding relative position at which said first member engages said second member is varied in the event that said motor is operated in either direction for an interval longer than said motor is operated in its opposite direction.

3. The combination with a normally inactive reversible motor which is effective when controlled in a first direction to move a first biased member against its bias out of engagement with a normally positioned second member to thereby remove said first member from control of a control circuit controlled by the two members when in corresponding relative positions, of retarding means operative when said motor is reversed and effective independently of the operation of said motor to control the movement of said first member in response to its bias toward said second member, and means responsive to the operation of said motor for moving said second member to a position determined in relation to its normal position by the relative time intervals that said motor is operated in each of its directions, whereby the corresponding relative positions at which said first and second members engage are varied in the event that said motor is operated in either direction longer than in its opposite direction.

4. In combination, a reversible motor, control means for selectively operating said motor, two members each biased into mutual engagement when such members are in corresponding relative positions, two cams one for each of said members, clutch means for a first of said cams and controlled by said control means to be operative when and only when said motor is controlled in a first direction for operatively connecting said first cam with said motor for actuating the associated first member against its bias out of engagement with the second member, retarding means operatively connected with said first member and effective when said first cam is disconnected from said motor in response to a reversal of the motor for retarding the return of said first member in response to its bias toward said second member independently of the operation of said motor, and means for operatively connecting said motor with the second of said cams for actuating said second member in each of the two motor operating directions to a position determined by the relative time intervals that said motor is operated in each of its two directions, whereby the corresponding relative position at which said first member engages said second member is varied in the event that said motor is operated in either direction for an interval longer than said motor is operated in its opposite direction.

5. In combination, a reversible motor, control means for selectively operating said motor, two members each having a normal position and each biased into mutual engagement when such members are in corresponding relative positions, two cams one for each of said members, clutch means for a first of said cams and controlled by said control means to be operative when and only when said motor is controlled in a first direction for operatively connecting said first cam with said motor for actuating the associated first member against its bias out of engagement with the second member, retarding means operatively connected with said first member and effective when said first cam is disconnected from said motor in response to a reversal of the motor for retarding the return of said first member in response to its bias toward said second member independently of the operation of said motor, means for operatively connecting said motor with the second of said cams for actuating said second member in each of the two motor operating directions to a position determined by the relative time intervals that said motor is operated in each of its two directions, whereby the corresponding relative position at which said first member engages said second member is varied in the event that said motor is operated in either direction for an interval longer than said motor is operated in its opposite direction, and other control means operatively connected with said motor and responsive to the operation thereof for subsequently controlling said motor to restore said two member to their normal positions.

PAUL J. SIMMEN.